(12) United States Patent
Shenaq et al.

(10) Patent No.: US 10,272,858 B2
(45) Date of Patent: Apr. 30, 2019

(54) BUMPER ASSEMBLY

(71) Applicant: Ford Global Technologies, LLC, Dearborn, MI (US)

(72) Inventors: Mohammed Shenaq, Dearborn, MI (US); Sudip Sankar Bhattacharjee, Novi, MI (US); Stephen Noel Pingston, Royal Oak, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/492,356

(22) Filed: Apr. 20, 2017

(65) Prior Publication Data

US 2018/0304839 A1    Oct. 25, 2018

(51) Int. Cl.
*B60R 19/18*    (2006.01)
*B60R 19/52*    (2006.01)

(52) U.S. Cl.
CPC .............. *B60R 19/18* (2013.01); *B60R 19/52* (2013.01); *B60R 2019/186* (2013.01); *B60R 2019/1893* (2013.01)

(58) Field of Classification Search
CPC ... B60R 19/18; B60R 19/52; B60R 2019/527; B60R 2019/1893; B60R 2019/1886
See application file for complete search history.

(56) References Cited

U.S. PATENT DOCUMENTS

| 7,568,746 | B2 | 8/2009 | Jaarda et al. |
| 7,938,463 | B2 * | 5/2011 | Lee .................. B60R 19/18 293/120 |
| 8,585,106 | B2 | 11/2013 | Gukkenberger et al. |
| 8,684,427 | B2 | 4/2014 | Marur et al. |
| 8,973,957 | B2 | 3/2015 | Corwin et al. |
| 9,205,794 | B1 | 12/2015 | Farooq et al. |
| 2006/0028038 | A1 | 2/2006 | Glasgow et al. |
| 2007/0200376 | A1 | 8/2007 | Jaarda et al. |
| 2009/0152883 | A1 | 6/2009 | Lee |
| 2009/0206618 | A1 | 8/2009 | Ralston et al. |
| 2012/0104775 | A1 | 5/2012 | Marur et al. |
| 2013/0113226 | A1 | 5/2013 | Bobba et al. |

FOREIGN PATENT DOCUMENTS

CN    101844550 A    9/2010
EP    1369308 A1    12/2003

OTHER PUBLICATIONS

Search Report from United Kingdom Intellectual Property Office dated Oct. 5, 2018 regarding Application No. GB1806316.4 (4 pages).

* cited by examiner

*Primary Examiner* — D Glenn Dayoan
*Assistant Examiner* — Melissa A Black
(74) *Attorney, Agent, or Firm* — Frank A. MacKenzie; Bejin Bieneman PLC

(57) ABSTRACT

A vehicle component includes a main panel extending in a first direction; a plurality of lobes extending in a second direction transverse to the first direction; and a plurality of ridges extending in the second direction. Each ridge extends around a subset of the lobes. Each lobe may be encircled by one of the ridges. The cover may include a plurality of depressions connecting the ridges to the corresponding lobes.

19 Claims, 3 Drawing Sheets

BUMPER ASSEMBLY

BACKGROUND

Bumpers of vehicles are designed to absorb energy and/or transfer energy during vehicle impacts. Such vehicle impacts may include frontal and rear impacts. Impacts may occur with objects of varying size and mass, and various testing simulates such impacts. For example, one test is for low-speed damageability, which is simulated by impact tests that measure the amount of damage to the exterior of the bumper resulting from low-speed impacts. In these tests, little or no exterior damage to the bumper is desired to reduce the likelihood of costly repairs resulting from low-speed impacts. As another example, the vehicle may impact narrower, lighter objects, such as pedestrians. These impacts may be simulated by pedestrian protection (PedPro) impact tests.

These different classes of impacts present competing design factors for the bumper. During low-speed damageability tests, it may be beneficial for the bumper to be rigid, with no deformation, to reduce the likelihood of damage to the exterior of the bumper. In contrast, during an impact with a narrower object that may be a pedestrian, it may be more beneficial to reduce the stiffness of the bumper during deformation, which may reduce injuries to the pedestrian.

DETAILED DESCRIPTION

Figure 1:
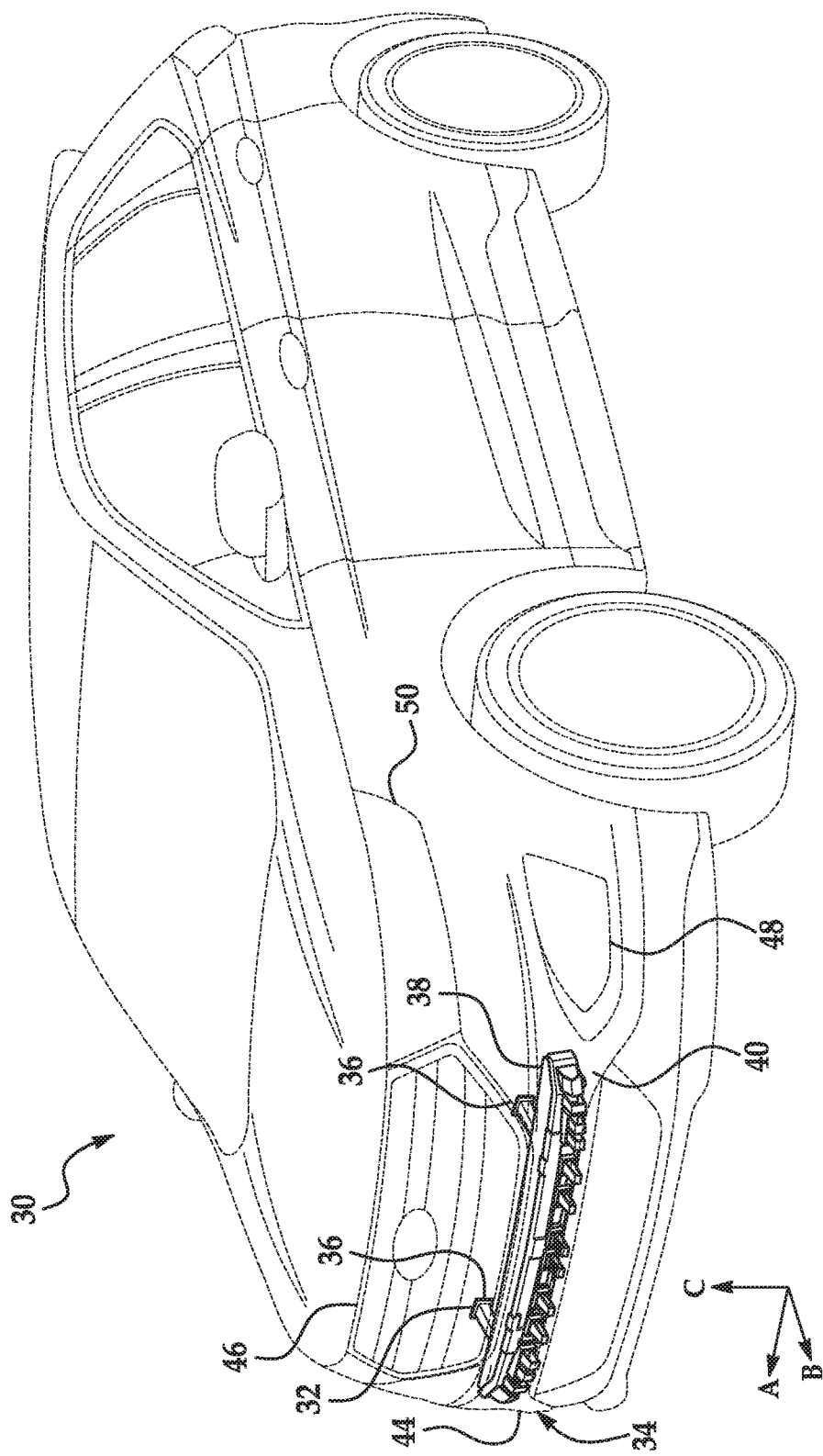
FIG. 1 is a perspective view of a vehicle.

A vehicle component includes a main panel extending in a first direction; a plurality of lobes extending in a second direction transverse to the first direction; and a plurality of ridges extending in the second direction, each ridge extending around a subset of the lobes.

Each lobe may be encircled by one of the ridges. The cover may include a plurality of depressions connecting the ridges to the corresponding lobes.

Each ridge may extend around one of the plurality of lobes.

The lobes may be arranged in a row.

Each of the lobes may extend farther from the main panel than each of the ridges extends from the main panel.

Each of the ridges may have an arch-shaped cross-section extending around the subset of the lobes.

Each lobe may have a forward panel facing in the second direction and a plurality of side panels extending from the forward panel opposite the second direction. The cover may have a plurality of depressions extending from the ridges to the side panels of the corresponding lobes. Each ridge may extend along an arch-shape between the corresponding depression and the main panel. The plurality of side panels for each lobe may include at most two side panels. For example, one of the side panels for each lobe may face in the first direction, and the other of the side panels for each lobe may face opposite the first direction. Each of the side panels may have a cutout. Each of the cutouts may be spaced from the corresponding forward panel and from the corresponding depression. For another example, one of the side panels may face in a third direction transverse to the first and second directions, and the other of the side panels may face opposite the third direction.

A vehicle component includes a bumper beam and a cover fixed relative to the bumper beam. The cover includes a plurality of lobes extending in a direction away from the bumper beam and a plurality of ridges extending in the direction away from the bumper beam. Each ridge extends around a subset of the lobes.

The cover may extend at least partially around the bumper beam.

The vehicle component may include a fascia extending parallel to and coupled to the bumper beam. The cover is coupled to the fascia. The vehicle component may include a grill fixed above the fascia, and the cover may be coupled to the grill.

The bumper assembly can contribute to both pedestrian impact performance and to low-speed damageability performance, and the contributions can be independently tunable. Specifically, the lobes can be tuned for better performance during pedestrian impacts, and the ridges can be tuned for better performance during low-speed impacts with larger objects. The lobes can offer relatively lower resistance and absorb energy from a pedestrian impact before the pedestrian impacts the ridges or the bumper beam. The ridges can offer relatively higher resistance during an impact that has already deformed the lobes. The bumper assembly may reduce a likelihood of injury to pedestrians and a likelihood of serious damage to the vehicle.

With reference to FIG. 1, a vehicle 30 includes a frame 32, and a bumper assembly 34 is attached to the frame 32. The bumper assembly 34 may be disposed toward a front of the vehicle 30, as shown in FIG. 1, or toward a rear of the vehicle 30. The bumper assembly 34 may protrude from the frame 32 such that the bumper assembly 34 is the first component of the vehicle 30 impacted in a front or rear collision.

The frame 32 may be of any suitable construction, e.g., unibody construction, body-on-frame construction, or of any other suitable construction. The frame 32 may be formed of any suitable material, for example, steel, aluminum, etc.

Figure 2:
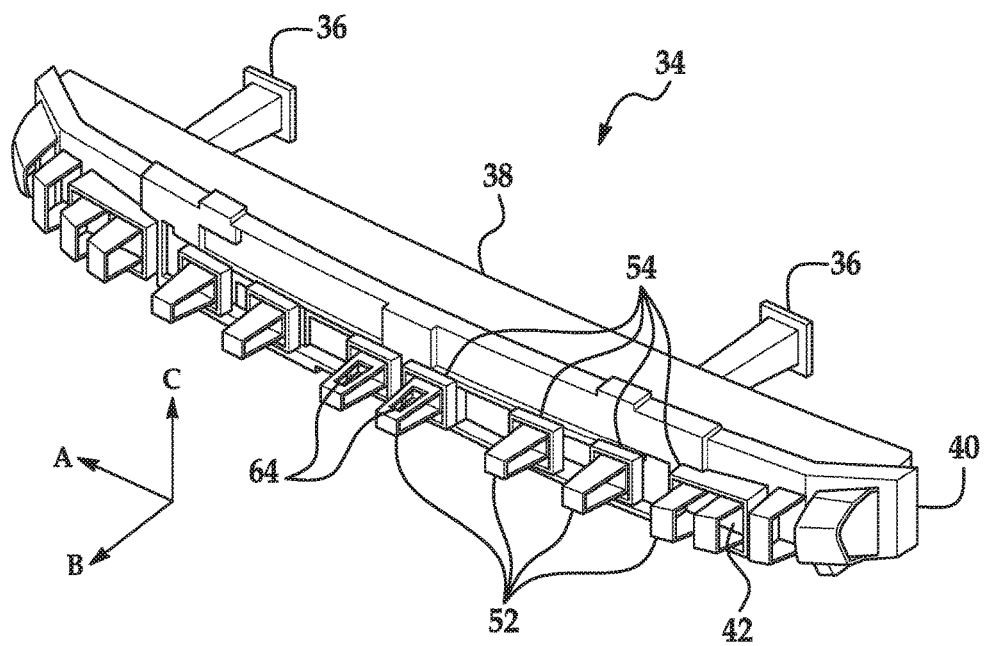
FIG. 2 is a perspective view of a bumper assembly of the vehicle.

With reference to FIGS. 1 and 2, the frame 32 may include crush cans 36 supporting the bumper assembly 34 on the frame 32. The crush cans 36 may extend in a vehicle-forward direction from the rest of the frame 32 to a bumper beam 38 of the bumper assembly 34. The crush cans 36 may be fastened, welded, etc. to the rest of the frame 32.

The crush cans 36 may serve as energy absorbers, sometimes known as "crumple zones." The crush cans 36 may absorb some of the energy of a collision of the vehicle 30 through deformation, thus lessening the amount of energy transferred to the rest of the frame 32 and the vehicle 30.

With continued reference to FIGS. 1 and 2, the bumper assembly 34 may include the bumper beam 38 fixed to the frame 32 and a cover 40 fixed relative to the bumper beam 38.

The bumper beam 38 extends longitudinally across a front or rear of the vehicle 30, parallel to the cover 40, and may define a first direction A. (The adjectives "first," "second," and "third" are used throughout this document as identifiers and are not intended to signify importance or order.) The first direction A may point right or left relative to the vehicle 30. The bumper beam 38 is fixed to the frame 32, and, specifically, may be fixed to the crush cans 36. The bumper beam 38 may have a vehicle-outward face 42, which for a front bumper assembly 34 faces the direction of the vehicle 30 when traveling forward and for a rear bumper assembly 34 faces the direction of the vehicle 30 when traveling in reverse. The bumper beam 38 may reinforce the structural integrity of the vehicle 30. The bumper beam 38 may be formed of any suitable material, for example, steel, aluminum, etc.

With reference to FIG. 1, a fascia 44 may extend parallel to the bumper beam 38, in the first direction A. The fascia 44 is coupled to the bumper beam 38, either directly or indirectly. The fascia 44 may extend around the cover 40 and the bumper beam 38, thereby concealing the cover 40 and the bumper beam 38. The fascia 44 may present a class-A surface, i.e., a surface specifically manufactured to have a high-quality, finished aesthetic appearance free of blemishes. The fascia 44 may be supported by the frame 32 and/or body components of the vehicle 30.

A grill 46 may be fixed above the fascia 44. The grill 46 may be coupled, directly or indirectly, to the frame 32. The grill 46 is a grating or screen allowing air to enter the vehicle 30 and to reach an engine compartment.

Fog lamps 48 may be fixed relative to the frame 32 and positioned in the fascia 44. The fog lamps 48 may be directed in a vehicle-forward direction. The fog lamps 48 may provide a wide beam of light with a sharp cutoff at the top of the beam of light. The fog lamps 48 may be positioned below headlamps 50.

With reference to FIG. 2, the cover 40 extends in the first direction A, parallel to the bumper beam 38. The cover 40 may extend along a full length of the bumper beam 38. The cover 40 may be adjacent to the vehicle-outward face 42 of the bumper beam 38; that is, nothing is between the cover 40 and the vehicle-outward face 42. The cover 40 may extend at least partially around the bumper beam 38. For example, the cover 40 may extend above and/or below the bumper beam 38.

The cover 40 is fixed relative to the bumper beam 38. For example, the cover 40 may be fixed directly to the bumper beam 38, e.g., fastened or adhered to the bumper beam 38. The cover 40 may fix itself to the bumper beam 38 by extending around the bumper beam 38. For another example, the cover 40 may be coupled to the fascia 44, directly or indirectly. For another example, the cover 40 may be coupled to the grill 46, directly or indirectly. For another example, the cover 40 may be coupled to the fog lamps 48, directly or indirectly. For another example, the cover 40 may be coupled, directly or indirectly, to multiple of the bumper beam 38, the fascia 44, the grill 46, and the fog lamps 48.

Figure 3:
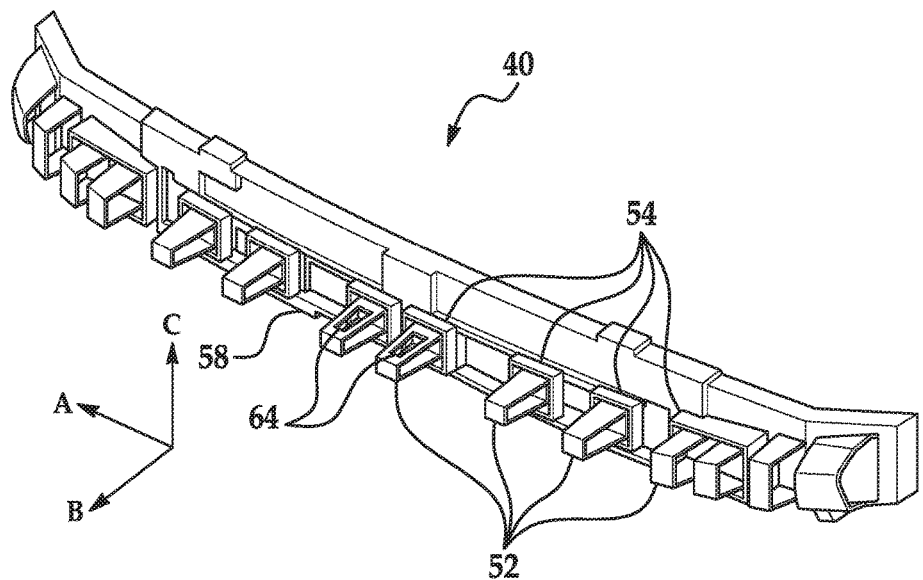
FIG. 3 is a perspective view of a cover of the bumper assembly.

With reference to FIG. 3, the cover 40 includes a plurality of lobes 52. The lobes 52 may be arranged in a row, e.g., arranged sequentially in the first direction A. The lobes 52 may have other arrangements, e.g., multiple rows.

The cover 40 includes a plurality of ridges 54. Each lobe 52 may be encircled by one of the ridges 54. Multiple lobes 52 may be encircled by the same ridge 54, and/or one lobe 52 may be encircled by one of the ridges 54. In the example shown in FIGS. 1-3, the cover 40 includes multiple lobes 52 encircled by the same ridge 54, and includes a plurality of single lobes 52 each encircled by one of the ridges 54, respectively. Each ridge 54 may extend around a subset of the lobes 52. "Subset" means at least one and less than all, i.e., in set-theory terminology, a strict subset. Each ridge 54 may extend around only one of the plurality of lobes 52.

Figure 4:
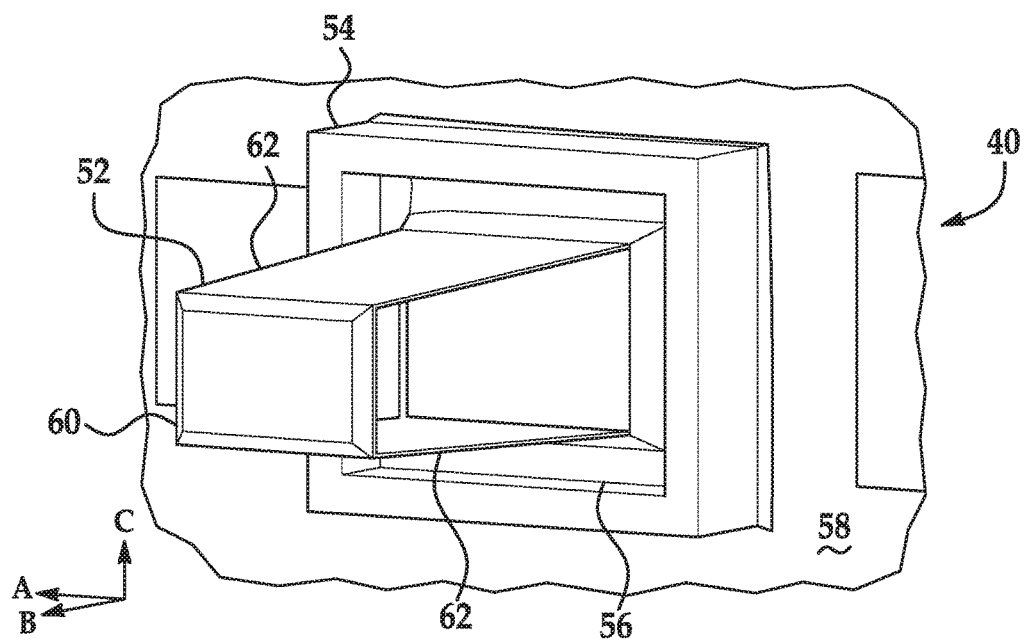
FIG. 4 is a perspective view of a portion of the cover.
Figure 5:
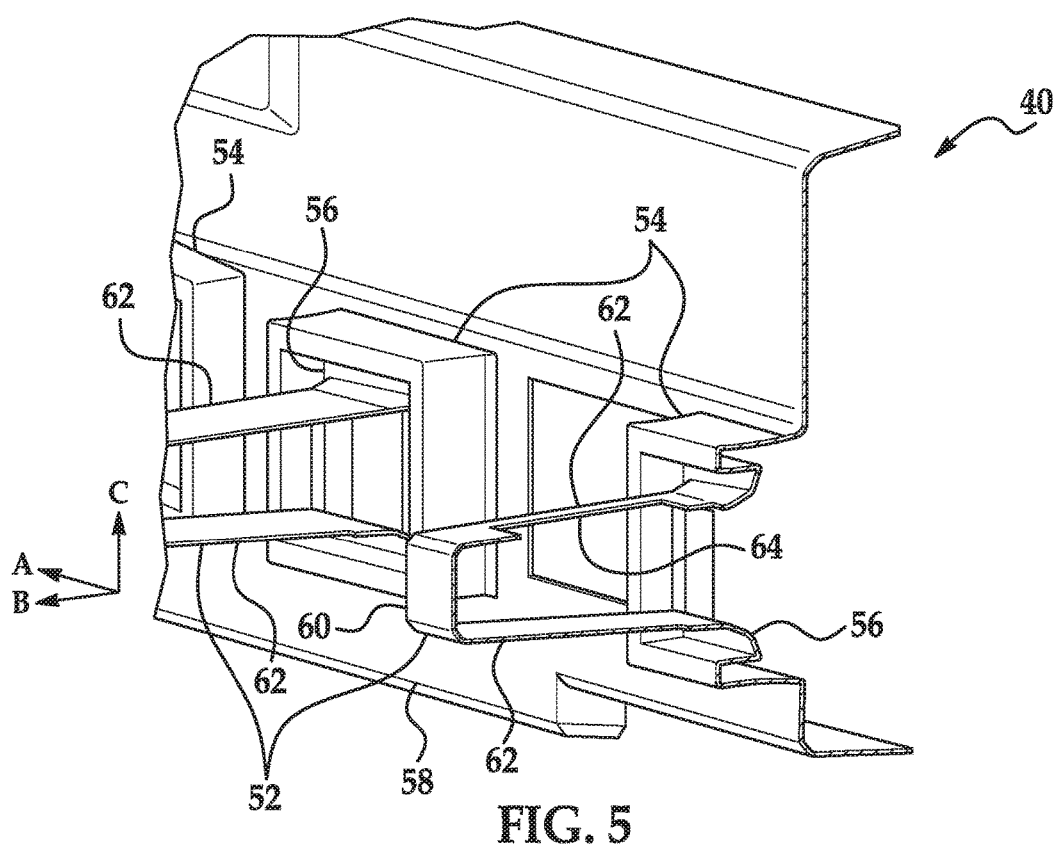
FIG. 5 is a cross-sectional perspective view of a portion of the cover.

With reference to FIGS. 4 and 5, the cover 40 includes a plurality of depressions 56 connecting the ridges 54 to the corresponding lobes 52. The depressions 56 extend from the lobes 52 to the corresponding ridges 54. If multiple lobes 52 are encircled by the same ridge 54, the corresponding depression 56 may extend from ones of the lobes 52 to others of the lobes 52 and to the ridge 54.

The cover 40 includes a main panel 58. The main panel 58 extends in the first direction A. The main panel 58 extends from ones of the ridges 54 to others of the ridges 54. The main panel 58 may also extend to lobes 52 that are not encircled by a ridge 54. The main panel 58 connects to the ridges 54 from outside the ridges 54.

The plurality of lobes 52 extend from the main panel 58 in a second direction B transverse to the first direction A. The second direction B may be perpendicular to the first direction A. The second direction B may point away from the bumper beam 38. The second direction B may point forward relative to the vehicle 30. Each lobe 52 may have a forward panel 60 facing in the second direction B; that is, the second direction B is orthogonal to the forward panel 60. The lobes 52 may be adjacent the bumper beam 38; in other words, nothing is between the lobes 52 and the bumper beam 38. Specifically, no portion of the cover 40 extends between the lobes 52 and the bumper beam 38; in other words, the lobes 52 lack rear panels.

Each lobe 52 has a plurality of side panels 62 extending from the forward panel 60 opposite the second direction B, that is, toward the bumper beam 38. The side panels 62 extend from the depressions 56 to the corresponding forward panels 60. The side panels 62 for each lobe 52 may be connected to each other or may be spaced from each other. For example, the plurality of side panels 62 for each lobe 52 may include at most two side panels 62. One of the side panels 62 for each lobe 52 may face in the first direction A, and the other of the side panels 62 for each lobe 52 may face opposite the first direction A. Alternatively, one of the side panels 62 may face in a third direction C transverse to the first and second directions A, B, and the other of the side panels 62 for each lobe 52 may face opposite the third direction C. The third direction C may be perpendicular to the first direction A and/or to the second direction B. The third direction C may point up relative to the vehicle 30.

Each of the side panels 62 may have a cutout 64. The cutout 64 is missing material from the side panel 62. The cutout 64 may be spaced from edges of the side panel 62, that is, may be circumscribed by the side panel 62. The cutout 64 may be spaced from the corresponding forward panel 60 and from the corresponding depression 56.

The plurality of ridges 54 extends in the second direction B, that is, away from the bumper beam 38. The lobes 52 may be taller than the ridges 54; in other words, each of the lobes 52 may extend farther from the main panel 58 than each of the ridges 54 extends from the main panel 58. Each ridge 54 may extend along an arch-shape between the corresponding depression 56 and the main panel 58. The arch-shape of the ridge 54 curves away from the bumper beam 38. A concave side of each ridge 54 may face the bumper beam 38, and a convex side may face away from the bumper beam 38. The arch-shape of each ridge 54 may be a cross-section of the ridge 54 extending around the corresponding subset of lobes 52.

The lobes 52 and ridges 54 may each have a gauge. "Gauge" means a thickness of a sheet forming a component, i.e., a wall thickness (not a thickness of the component as a whole). For a component or region having a differing sheet or wall thickness, the gauge may be an average gauge weighted by a surface area of the sheet or wall. The gauge of the ridges 54 may be thicker than the gauge of the lobes 52. More specifically, the gauge of each of the ridges 54 may be thicker than the gauge of each of the lobes 52. Alternatively or additionally, the gauge of each of the ridges 54 may be thicker than the gauge of each of the side panels 62 of the lobes 52.

The depressions 56 may extend from the ridges 54 to the side panels 62 of the corresponding lobes 52. The depressions 56 may have a flat shape, which may be orthogonal to the first direction A. Alternatively, the depressions 56 may curve from the ridges 54 to the lobes 52, with a convex side of each depression 56 facing the bumper beam 38 and a concave side of each depression 56 facing away from the bumper beam 38.

The cover 40 may be formed of any suitable material, including plastic, such as injection-molded plastic; metal, such as aluminum or steel; or any other suitable material.

The cover 40 may be integral, that is, formed as a single, continuous piece. The cover 40 may be formed by any suitable method. For example, the cover 40 may be injection-molded. For another example, the cover 40 may be stamped. In order to be injection-molded or stamped, the cover 40 may have no overlapping panels or walls in a particular direction, e.g., in the second direction B, that is, may lacking overhangs, undercuts, etc.

In the event of an impact with an impactor that is a pedestrian or a similarly light object, first the fascia 44 will deform from impacting the impactor. Next, the impactor may impact one or more of the lobes 52. The lobes 52 may deform from the impact, absorbing energy from the impact. This absorption of energy may reduce an amount of energy transferred to the impactor compared to a bumper assembly without the lobes 52. The resistance offered by the lobes 52 is relatively low compared to the resistance offered by the ridges 54. The resistance offered by the lobes 52 is affected by values of the size, geometry, material, and gauge of the lobes 52, and those values may have been chosen based on testing for behavior when impacting a pedestrian.

In the event of an impact with an impactor that is significantly larger than a pedestrian, first the fascia 44 will deform from impacting the impactor. Next, the impactor may impact one or more of the lobes 52, which may deform from the impact. Next, the impactor may impact the ridges 54. The ridges 54 may deform from the impact, absorbing energy from the impact. The absorption of energy may reduce an amount of energy transferred to the impactor and to the vehicle 30 compared to a bumper without the ridges 54. The resistance offered by the ridges 54 is relatively high compared to the resistance offered by the lobes 52. The resistance offered by the ridges 54 is affected by values of the size, geometry, material, and gauge of the ridges 54, and those values may have been chosen based on testing for behavior during a low-speed damageability test. For example, the gauge of the ridges 54 may have been chosen to be thicker than the gauge of the lobes 52.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle component comprising:
a main panel extending in a first direction;
a plurality of lobes extending in a second direction transverse to the first direction; and
a plurality of ridges extending in the second direction, each ridge extending around a subset of the lobes;
wherein each lobe has a forward panel facing in the second direction and a plurality of side panels extending from the forward panel opposite the second direction.

2. The vehicle component of claim 1, wherein each lobe is encircled by one of the ridges.

3. The vehicle component of claim 2, wherein the cover includes a plurality of depressions connecting the ridges to the corresponding lobes.

4. The vehicle component of claim 1, wherein each ridge extends around one of the plurality of lobes.

5. The vehicle component of claim 1, wherein the lobes are arranged in a row.

6. The vehicle component of claim 1, wherein each of the lobes extend farther from the main panel than each of the ridges extends from the main panel.

7. The vehicle component of claim 1, wherein each of the ridges has an arch-shaped cross-section extending around the subset of the lobes.

8. The vehicle component of claim 1, wherein the cover has a plurality of depressions extending from the ridges to the side panels of the corresponding lobes.

9. The vehicle component of claim 8, wherein each ridge extends along an arch-shape between the corresponding depression and the main panel.

10. The vehicle component of claim 9, wherein the plurality of side panels for each lobe includes at most two side panels.

11. The vehicle component of claim 10, wherein one of the side panels for each lobe faces in the first direction, and the other of the side panels for each lobe faces opposite the first direction.

12. The vehicle component of claim 11, wherein each of the side panels has a cutout.

13. The vehicle component of claim 12, wherein each of the cutouts is spaced from the corresponding forward panel and from the corresponding depression.

14. The vehicle component of claim 10, wherein one of the side panels faces in a third direction transverse to the first and second directions, and the other of the side panels faces opposite the third direction.

15. A vehicle component comprising:
a bumper beam; and
a cover fixed relative to the bumper beam;
the cover including a plurality of lobes extending in a direction away from the bumper beam and a plurality of ridges extending in the direction away from the bumper beam; and
each ridge extending around a subset of the lobes, at least one of the ridges extending around at least two of the lobes.

16. The vehicle component of claim 15, wherein the cover extends at least partially around the bumper beam.

17. The vehicle component of claim 15, further comprising a fascia extending parallel to and coupled to the bumper beam.

18. The vehicle component of claim 17, wherein the cover is coupled to the fascia.

19. The vehicle component of claim 17, further comprising a grill fixed above the fascia; wherein the cover is coupled to the grill.

* * * * *